United States Patent Office 3,173,244
Patented Mar. 16, 1965

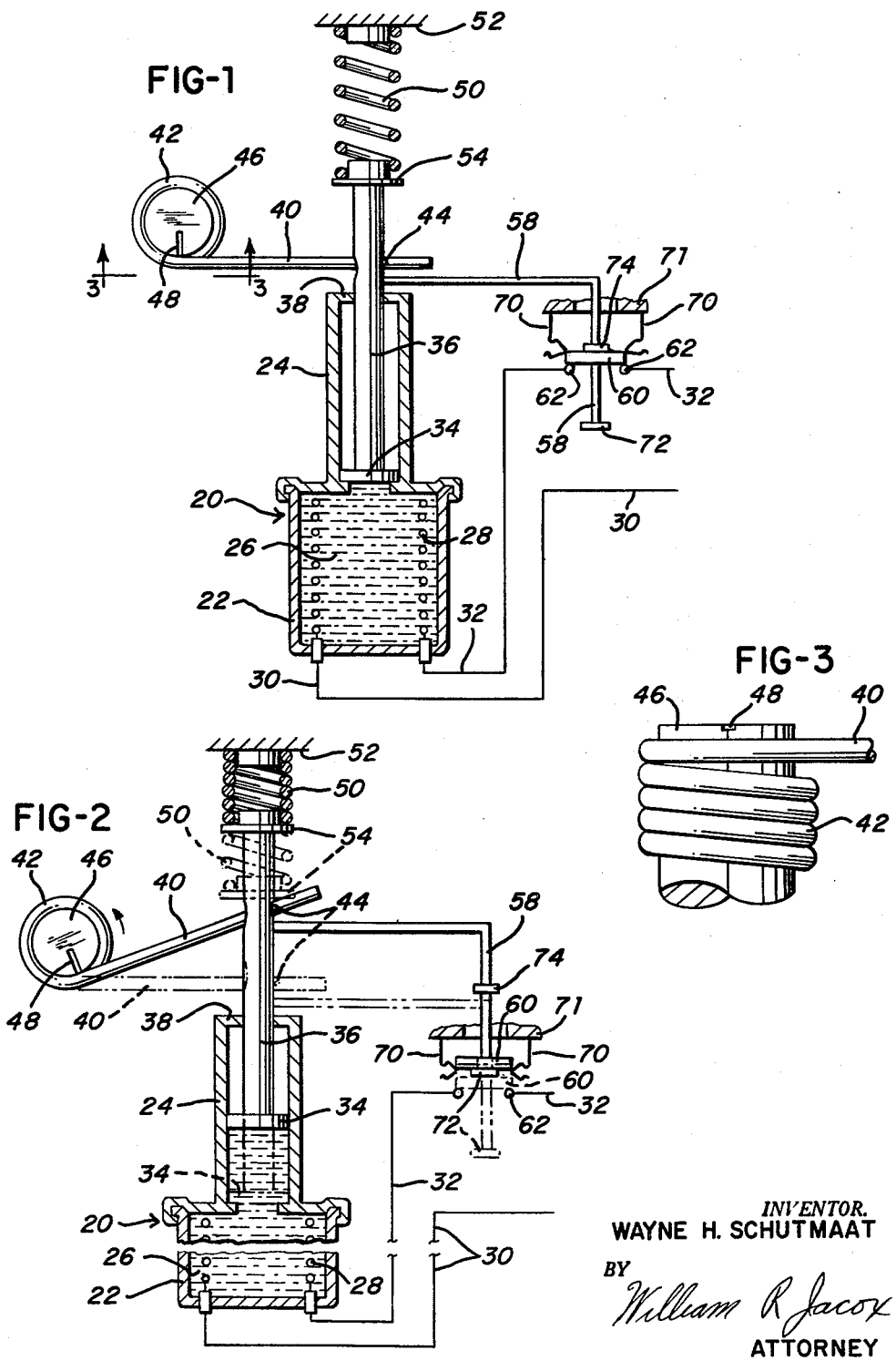

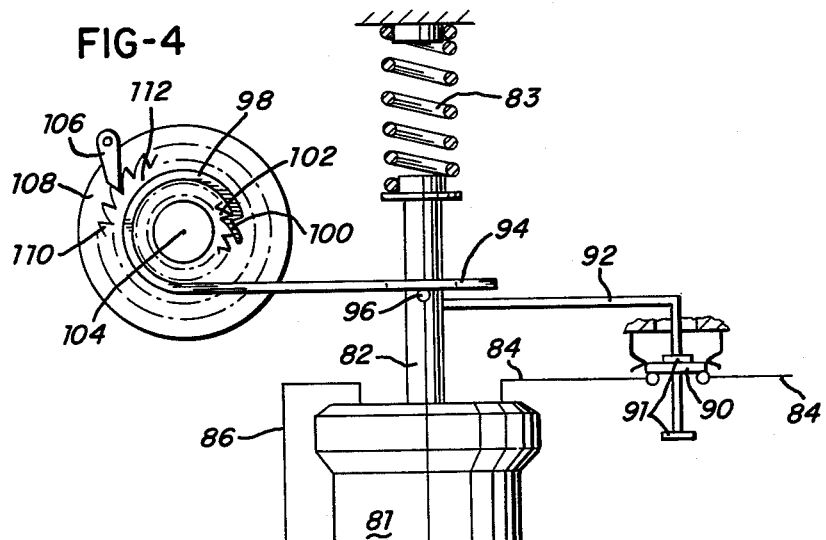
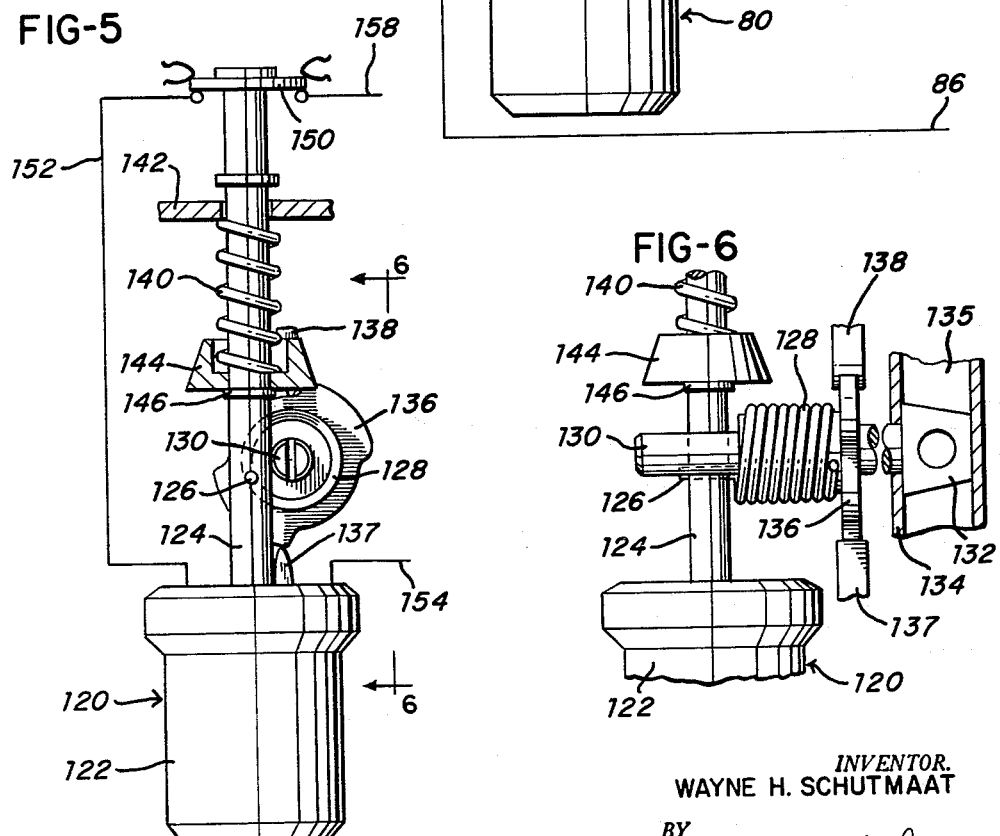

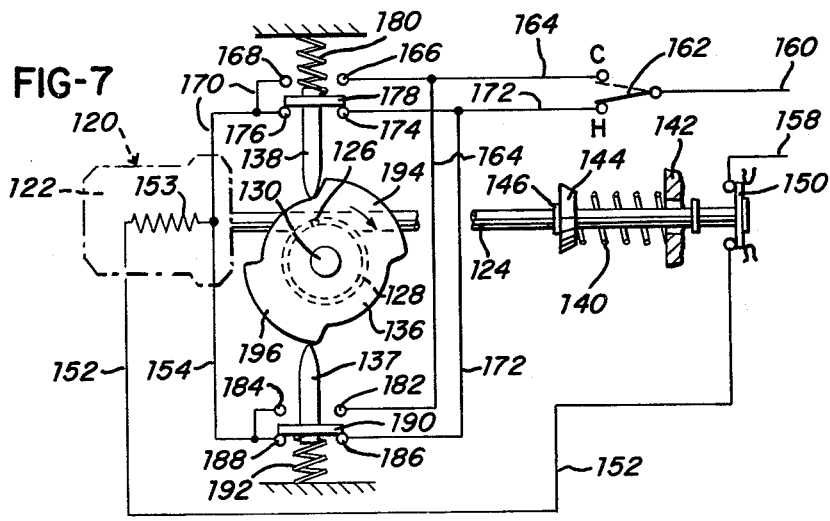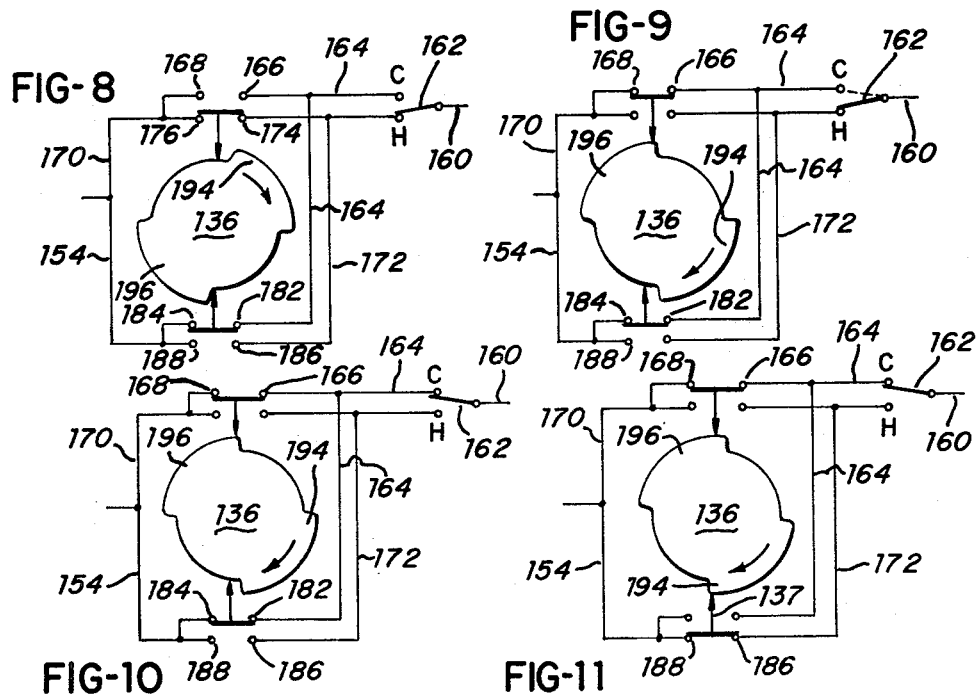

1

3,173,244
CONTROL APPARATUS
Wayne H. Schutmaat, Needham, Mass., assignor to Standard-Thomson Corporation, Waltham, Mass., a corporation of Delaware
Filed Feb. 13, 1962, Ser. No. 172,944
7 Claims. (Cl. 60—23)

This invention relates to control apparatus. The invention relates more particularly to electrically operable control or actuator apparatus.

An object of this invention is to provide means by which an intermittently operable reciprocally linearly movable actuator serves as motor means for rotary movement of another element.

Another object of this invention is to provide control or actuator apparatus in which an electrothermal actuator member is used to cause rotary movement.

Another object of this invention is to provide electrothermal actuator or control means for accurate rotary movement of a shaft or the like.

Another object of this invention is to provide means for thermostatic operation or control of a valve member in a fluid system.

Another object of this invention is to provide such control or operator means by which energy is required only for moving a valve member and in which no energy is required after the valve member has been operated to its desired position.

Other objects and advantages reside in the construction of parts, the combination thereof, the method of manufacture, and the mode of operation, as will become more apparent from the following description.

In the drawings:

FIGURE 1 is a front view or plan view, with parts shown in section, illustrating mechanism of this invention in which reciprocal linear movement of one element is used to cause rotary movement of another element.

FIGURE 2 is a front view, or plan view, similar to FIGURE 1, with parts broken away and shown in section, illustrating a position of operation of the mechanism of FIGURE 1.

FIGURE 3 is an enlarged view taken substantially on line 3—3 of FIGURE 1.

FIGURE 4 is a front view or plan view showing a modification of the mechanism of this invention for using reciprocal linear movement of one element to cause rotary movement of another element.

FIGURE 5 is a front view or plan view showing mechanism of this invention as aplied to operation of a fluid valve.

FIGURE 6 is a view taken substantially on line 6—6 of FIGURE 5.

FIGURE 7 is a schematic or diagrammatic view showing in greater detail the control circuitry for the operator mechanism of FIGURES 5 and 6 in connection with thermostatic control of a fluid valve.

FIGURES 8, 9, 10, and 11 are fragmentary diagrammatic views showing a portion of the elements of FIGURE 7 and illustrating relative positions of some of the elements during operation thereof.

Referring to the drawings in detail, apparatus of this invention comprises an electrothermal actuator 20 which may be of any suitable type. Herein the actuator 20 includes a container 22 provided with a neck 24. Within the container 22 is a quantity of thermally responsive expansible-contractible material 26. The material 26 may be any element or group of elements having the desired expansion characteristics over a given temperature range. Also within the container 22 is an electric heater element 28 which is electrically connected to conductor members 30 and 32.

2

Within the neck 24 is a slidably movable piston 34 which is attached to a rod 36. The rod 36 extends through an end wall 38 of the neck 24.

Exterior of the neck 24 the rod 36 has a hole therethrough through which loosely extends an arm 40 of a helical spring 42. The arm 40 may be an integral part of the helical spring 42 or the arm 40 may be an element attached to the spring 42. A pin 44 is shown as being attached to the arm 40 adjacent the rod 36.

The helical spring 42 tightly encompasses a shaft 46. The shaft 46 has an indicator mark 48 to indicate the rotary position thereof.

A resilient member in the form of a spring 50 is compressed between a support member 52 and a collar 54. The collar 54 is rigidly attached to the rod 36 so that the spring 50 urges the rod 36 in a direction toward the container 22.

A stem 58 is rigidly attached to the rod 36 for movement therewith. The stem 58 carries a movable electrical switch contact member 60 which is normally in engagement with terminals 62 which are in the conductor 32. The switch contact 60 is axially movable upon the stem 58.

A pair of resilient clips 70 are carried by a support member 71 for a purpose discussed below. The stem 58 has firmly attached thereto an abutment member 72 and an abutment member 74 which are carried by the stem 58 at opposite sides of the switch contact member 60. The switch contact member 60 electrically connects the terminals 62 one to the other when in engagement therewith.

*Operation*

The normal position of the mechanism above described is shown in FIGURE 1.

When the electric conductor members 30 and 32 are energized, the heater element 28 is energized and dissipates heat. Thus, the thermally responsive expansible-contractible material 26 is heated. Sufficient heating of the material 26 causes expansion thereof, as shown in FIGURE 2. The material 26 expands into the neck 24 and forces movement of the piston 34.

Thus, the rod 36 is moved against the resilient forces of the spring 50. Movement of the rod 36 causes angular movement of the arm 40, as shown in FIGURE 2. Such movement of the arm 40 causes rotary movement of the helical spring 42 in a counter-clockwise direction, as viewed in FIGURE 2. When the arm 40 angularly moves in a counter-clockwise direction as shown in FIGURE 2, rotation of the helical spring 42 which results therefrom causes tightening of the helical spring 42 as each convolution thereof is slightly decreased in diameter. The pin 44, which is secured to the arm 40, engages the rod 36 and causes a pulling or tension action in the arm 40 as the rod 36 moves in a direction from the container 22. This tension in the arm 40 assists in causing a decrease in the diameter of each convolution of the helical spring 42 so that the helical spring 42 grasps the shaft 46 as the spring 42 is rotated. Thus, the shaft 46 rotates with counter-clockwise rotation of the helical spring 42.

The thermally responsive material 26 continues to expand as the material 26 is heated by the heater element 28. Thus, movement of the piston 34 and the rod 36 in a direction from the container 22 continues. The stem 58 moves with movement of the rod 36. When the abutment member 72 is moved sufficiently by the stem 58, the abutment member 72 forces the movable switch contact member 60 from engagement with the terminals 62. The switch contact member 60 becomes positioned between the two resilient clips 70 and out of engagement with the terminals 62. Thus, the circuit of the conductor 32 is interrupted and heating of the heater member 28 ceases and expansion of the thermally responsive material 26 ceases. Thus, movement of the piston 34 and the rod 36 ceases and rotation of the shaft 46 ceases.

With de-energization of the heater 28, the material 26 begins to cool and to contract. The spring 50 forces the rod 36 and the piston 34 toward the container 22 as the material 26 contracts in volume.

Movement of the rod 36 causes angular movement of the arm 40 in a clockwise direction. However, such clockwise movement of the arm 40 is in a direction causing the helical spring 42 to tend to unwind and thus causes a loosening of the spring 42 with respect to the shaft 46. Thus, the shaft 46 is not rotated in a clockwise direction as the rod 36 returns to its normal position within the neck 24 of the container 22. Thus, the shaft 46 remains in its rotated position as the helical spring 42 is returned to its normal position.

As stated above, the abutment member 74 is rigidly secured to the stem 58 for movement therewith. When the rod 36 returns to its normal position, the stem 58 causes the abutment member 74 to force the movable contact member 60 from the clips 70 and into engagement with the terminals 62. Thus, the heater element 28 is again energized. With re-energization of the heater element 28, the material 26 is again heated and the shaft 46 is again rotatively moved in the manner discussed above.

Thus, by intermittent reciprocal linear movement of the rod 36, the shaft 46 is caused to intermittently unidirectionally rotatively move.

FIGURE 4

FIGURE 4 shows a modification of the apparatus of this invention in which an electrothermal actuator 80 is provided with a container 81 which contains thermally responsive material which may be similar to the material 26 of FIGURE 1. The actuator 80 has an actuator rod 82 reciprocally movable with respect to the container 81. A compression spring 83 engages the actuator rod 82 and urges movement thereof toward the container 81.

Electric conductor leads 84 and 86 are connected to the actuator 80 for energization thereof. A limit switch mechanism 90, which may be of any suitable type, is connected in the conductor lead 84. The limit switch mechanism 90 is operable by movement of either one of two abutment members 91 which are secured to a stem 92 which is rigidly attached to the actuator rod 82.

An arm 94 rests upon a pin 96 which is firmly attached to the actuator rod 82. The arm 94 is integrally or otherwise attached to an arcuate resilient clip 98 which carries a finger 100. The finger 100 engages any one of a plurality of teeth 102 carried by a rotary shaft 104. A pawl 106 is pivotally carried by support structure 108 and engages any one of a plurality of teeth 110 which are carried by a disc 112 which is secured to the shaft 104 for rotation therewith. When the pawl 106 is in engagement with any one of the teeth 110 reversal of rotation of the shaft 104 is prevented.

When the conductors 84 and 86 are energized, the actuator rod 82 is forced to move in a direction from the container 81. This movement of the actuator rod 82 causes angular movement of the arm 94 so that the clip 98 rotatively moves and the finger 100, in engagement with one of the teeth 102, causes rotative movement of the shaft 104 in a counter-clockwise direction as viewed in FIGURE 4. When the actuator rod 82 moves the stem 92 sufficiently in a direction from the container 81 the limit switch mechanism 90 is operated and opens the electrical circuit to the actuator 80, causing de-energization thereof and cooling of the material within the container 81. The actuator rod 82 is then returned by the spring 83 to its normal position with respect to the container 81. However, when the actuator rod 82 returns to its normal position, the shaft 104 does not rotate clockwise. Thus, the shaft 104 is rotatively unidirectionally intermittently moved by the actuator rod 82.

FIGURES 5-11

FIGURES 5-11 illustrate the mechanism of this invention in thermostatic control of the operation of a rotary fluid valve.

FIGURES 5 and 6 show an actuator member 120 provided with a container 122 and a reciprocally movable actuator rod 124. The rod 124 has a substantially transverse bore within which a pin 126 is rotatably disposed. The pin 126 is secured integrally or otherwise to a helical spring 128 which tightly encompasses a shaft 130.

The shaft 130 has attached thereto for rotation therewith a rotary valve 132. A housing 134 encloses the valve 132 and has a passage 135 therethrough which is closed and opened by rotation of the valve 132.

The shaft 130 has a cam 136 attached thereto for rotation therewith. In engagement with the cam 136 are spaced-apart cam follower fingers 137 and 138.

The actuator rod 124 is biased toward the container 122 by a spring 140 which is compressed between support structure 142 and a slide collar 144. The collar 144 engages an abutment member 146 which is secured to the actuator rod 124.

Any suitable type of limit switch mechanism may be connected to the actuator rod 124. Herein limit switch mechanism 150 is connected in a conductor 152 which is joined to a heater element 153, shown diagrammatically in FIGURE 7 and disposed within the container 122. The container 122 also has therewithin a quantity of thermally responsive material (not shown) which is similar to the material 26 of FIGURES 1 and 2. A conductor 154 also is electrically connected to the heater element 153 within the container 122.

FIGURE 7 shows diagrammatically and more completely the electrical circuitry used to control energization of the heater element 153 which is disposed within the container 122. Electric conductor leads 158 and 160 are adapted to be connected to a source of electrical energy. The conductor lead 158 connects to the limit switch 150. The lead 160 also connects to a thermostatic control switch 162. The control switch 162 has a "heat" position herein referred to as a thermal H, and a "cool" position, herein referred to as a thermal C. The control switch 162 may be moved to either one of these positions by thermal operation or by manual operation.

The terminal C is jointed by a lead 164 to a terminal 166. The terminal 166 has a companion terminal 168 which is jointed to a lead 170 which connects to the heater element 153. A lead 172 joins the terminal H to a terminal 174. The terminal 174 has a companion terminal 176.

A movable contact switch 178 is rigidly carried by the cam follower finger 138. The finger 138 is biased toward the cam 136 by a spring 180. The movable contact switch 178 is adapted to electrically connect the terminal 174 to the terminal 176 or the terminal 166 to the terminal 168.

The lead 164 also connects to a terminal 182. The terminal 182 has a companion terminal 184. The lead 172 also connects to a terminal 186 which has a companion terminal 188. The terminals 184 and 188 are connected to the conductor 154.

A movable contact switch 190 is rigidly carried by the cam follower finger 137. The finger 137 is biased toward the cam 136 by a spring 192. The movable contact switch 190 is adapted to electrically connect the terminal 186 to the terminal 188 or the terminal 182 to the terminal 184.

The cam 136 has a pair of opposed lobes 194 and 196. The valve 132 controls fluid in a heating conduit so that the fluid flowing when the valve is opened affects the temperature of the thermostatic switch 162. When the cam 136 is positioned as shown in FIGURE 7, the valve 132 is in a closed position so that the fluid cannot flow through the passage 135 of the housing 134.

*Operation of apparatus of FIGURES 5-11*

In regard to FIGURE 7, it is assumed that the thermostatic switch 162 has just moved to engagement with the H terminal. Thus, the thermostatic switch 162 has just moved to "call for" heat. Therefore, when the conductor leads 158 and 160 are connected to a source of electrical energy, current flows through both of the switches 178 and 190 to the electrical heater element 153. Thus, the actuator rod 124 is moved in a direction from the container 122. Movement of the actuator rod 124 causes movement of the pin 126 which is attached thereto. The pin 126 causes the helical spring 128 to tighten upon the shaft 130 and to rotatively move the shaft 130.

FIGURES 8, 9, 10, and 11 illustrate more diagrammatically operation of the control apparatus. The cam 136, of course, rotates with the shaft 130. A few degrees of rotation of the cam 136 causes the lobe 196 thereof to move from engagement with the cam follower finger 137, as shown in FIGURE 8. Thus, an electric circuit through the terminals 182 and 184 is established. The purpose of which is discussed below.

Also, as shown in FIGURE 8, the cam follower finger 138 remains in engagement with the body portion of the cam 136. Thus, the circuit through the terminals 174 and 176 is maintained. Therefore, the electric heater element 153 of the actuator 120 is energized until the shaft 130 is rotated by the actuator rod 124 to such an extent that the lobe 196 of the cam 136 moves the finger 138, as shown in FIGURE 9.

When the cam 136 is in the position as shown in FIGURE 9, the valve 132 is in its open position. Therefore, fluid flows through the passage 135 and cause heating which, as stated above, affects the thermostatic switch 162.

During time that the cam 136 and the thermosatic switch 162 are positioned as shown in FIGURE 9, the heater element 153 is de-energized and is cooling. Thus, the spring 140 moves the actuator rod 124 to its innermost position with respect to the container 122. However, the shaft 130 is not rotatively moved by inward movement of the actuator rod 124. This is due to the fact that the helical spring 128 is released from tight engagement with the shaft 130 when the actuator rod 124 moves in the direction toward the container 122.

Sufficient heating of the thermostatic switch 162 causes the switch 162 to thermostatically move to the "cool" position so that the switch 162 engages the C terminal, as illustrated in FIGURE 10. Thus, the heater element 153 is again heated. Thus, the actuator rod 124 is again moved in a direction from the container 122, causing the helical spring 128 to rotate the shaft 130 and the cam 136. During such rotation of the cam 136, the cam 136 is momentarily in the position shown in FIGURE 11, for a purpose discussed below. When the shaft 130 has rotated the cam 136 to the position thereof as shown in FIGURE 7, the valve 132 is again in its closed position so that fluid does not flow in the passage 135.

The cam follower finger 137 and the switch 190 operated thereby, which is in the circuitry to the heater element 153, provide means by which the valve 132 is caused to rotatively move a complete cycle if the thermostatic switch 162 should be manually moved to its opposite position, i.e. from H terminal to C terminal or vice versa, during rotation of the valve 132. Thus, if the thermostatic switch 162 should be manually moved to "cool" position after the cam 136 has reached the position shown in FIGURE 8, the heater element 153 will remain energized through the terminals 182 and 184 until the lobe 194 has engaged the finger 137 and has caused movement thereof. However, before the finger 137 is moved by the lobe 194, the finger 138 is moved by the lobe 196. Thus, a circuit is established through the terminals 166 and 168. Thus, the heater element 153 is energized until the actuator rod 124 causes the limit switch mechanism 150 to open. This permits the heater element 153 to cool and permits the spring 140 to return the actuator rod 124 to its innermost position with respect to the container 122. When this occurs the limit switch mechanism 150 is again closed and the heater element 153 is again energized and moves the actuator rod 124 and the shaft 130 until the lobe 194 of the cam 136 moves from engagement with the finger 138. The cam 136 is then in the position as shown in FIGURE 7 and the valve 132 is closed.

Likewise, if the thermostatic switch 162 should be manually moved to "heat" position while the valve 132 is being rotated to "cool" poistion, the finger 137, as shown in FIGURE 11, causes the switch 190 to maintain a circuit to the heater element 153 so that rotation of the valve 132 continues until the valve 132 is again in an open position.

Thus, it is understood that the mechanism of this invention provides means by which an intermittently linearly reciprocally unidirectionally movable actuator causes intermittent unidirectional rotary movement of a shaft. This invention also provides means by which the operation of a rotary valve is accurately thermostatically controlled.

It is to be understood that the apparatus of this invention is such that any suitable desired degree of rotative movement can be carried out by a single stroke of a linearly movable actuator rod.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Motor apparatus comprising:
   an electrothermal actuator,
   a reciprocally linearly movable member operably movable by the actuator in a direction therefrom,
   a rotary shaft member adjacent the linearly movable member,
   a helical spring closely encompassing the shaft member, the helical spring having an extension portion movable in a direction to and from the electrothermal actuator,
   means connecting the extension portion of the helical spring to the linearly movable member for movement of the extension portion with movement of the linearly movable member, movement of the extension portion causing rotative movement of the helical spring, the helical spring tightening upon the rotary shaft member when the helical spring is rotated in one direction, the helical spring loosening upon the shaft member when the helical spring is rotated in the opposite direction, tightening of the helical spring upon the shaft member causing rotative movement thereof with rotative movement of the helical spring,
   resilient means urging the linearly movable member in a direction toward the actuator,
   electric control means connected to the electrothermal actuator for energization thereof.

2. Motor means comprising:
   a container,
   thermally responsive work producing means within the container,
   electric heater means in thermal transfer relation with the thermally responsive work producing means, electric conductor means connected to the electric heater means, switch means connected to the conductor means for control of energizing thereof, a reciprocally linearly movable actuator rod partially disposed within the container and movable in a direction therefrom by operation of the thermally responsive work producing means, a rotatable shaft adjacent the actuator rod, a helical spring tightly encompassing the shaft, spring having an extension portion joined to the actuator rod for movement therewith, movement of the extension portion of the helical spring in one direction with respect to the container causing tightening of the helical spring upon the shaft and causing rotative movement of the shaft, resilient means urging the actuator rod toward the container, connector means joining the actuator rod to the switch means for operation thereof at a predetermined position of the actuator rod.

3. Motor apparatus comprising:

linearly reciprocally movable actuator means, a rotary shaft disposed substantially normal to the line of movement of the actuator means, a helical spring tightly encompassing the shaft, means connecting the helical spring to the linearly movable actuator means for rotary movement of the helical spring with linear movement of said actuator means, the helical spring grasping the shaft during rotation of the spring in one direction so that the spring causes rotative movement of the shaft and the spring being in released poistion with respect to the shaft during rotation of the spring in the opposite direction.

4. Unidirectional intermittent rotary motor apparatus comprising:

a plunger, means for reciprocal linear movement of the plunger, a rotary shaft, an elongate helical resilient member tightly encompassing the shaft, the elongate helical resilient member having an end portion, means connecting the end portion of the helical resilient member to the plunger so that said end portion moves substantially linearly with movement of the plunger and upon movement of the plunger in one direction the helical resilient member rotatively moves and the diameter of the helical resilient member tends to decrease as the helical member becomes tighter upon the shaft causing the helical member to rotate the shaft with movement of the plunger, movement of the plunger in the reverse direction causing the helical member to rotate in the reverse direction and to increase in diameter so that the helical resilient member is loosened upon the shaft and the shaft is not rotated with such reverse rotation of the helical member.

5. Fluid control apparatus comprising:

a rotary valve including a shaft for rotation thereof, electrothermal actuator means, a reciprocally linearly movable plunger connected to the electrothermal actuator means, resilient helical means encompassing said shaft and in engagement therewith, means connecting the resilient helical means to the plunger so that reciprocal linear movement of the plunger causes reciprocal rotary movement of the helical means, rotative movement of the helical means in one direction causing grasping of the shaft by the helical means and causing rotative movement of the shaft, electric conductor means for connecting the electrothermal actuator means to a source of electrical energy, thermostatic switch means electrically connected to the conductor means, rotary position indicator means connected to the shaft for rotation therewith, electric switch means operably connected to said rotary position indicator means and electrically connected to said conductor means for control of the electrothermal actuator means.

6. Control apparatus comprising:

a reciprocal linearly movable plunger, means operatively connected to the plunger for reciprocal movement thereof, a rotary shaft adjacent the plunger and disposed substantially normal to the line of movement thereof, a group of radially extending teeth carried by the shaft and extending normally therefrom, a resilient arcuate clip partially encircling the group of teeth and having a finger engageable with any one of the teeth, an arm attached to the resilient arcuate clip, means loosely connecting the arm to the plunger for movement of the arm with movement of the plunger so that the resilient arcuate clip is caused to rotatively move with movement of the plunger, rotative movement of the clip in one direction causing the finger to maintain engagement with one of said teeth and to rotatively move the shaft, and means preventing rotation of the shaft in the opposite direction.

7. Unidirectional intermittent rotary mechanism comrising:

a reciprocally linearly movable actuator member, a rotary shaft, the rotary shaft having an axis substantially normal to the line of movement of the actuator member, a helical spring member tightly encompassing the rotary shaft, the helical spring member having a laterally extending portion, means connecting the extending portion of the helical spring member to the linearly movable actuator member so that the extending portion of the helical spring member moves substantially linearly with movement of the linearly movable actuator member, movement of the linearly movable actuator member in one direction causing the helical spring member to tend decrease in the diameter thereof so that the helical spring member grasps the rotary shaft and causes rotary movement thereof with linear movement of the actuator member, movement of the linearly movable actuator member in the reverse direction causing the helical spring to increase in diameter so that the helical spring member is loosened upon the rotary shaft and the rotary shaft is not rotated.

References Cited in the file of this patent

UNITED STATES PATENTS

| | | |
|---|---|---|
| 644,290 | Goodhue | Feb. 27, 1900 |
| 1,916,235 | Ruben | July 4, 1933 |
| 2,333,205 | Shafer | Nov. 2, 1943 |
| 2,357,059 | Ray | Aug. 29, 1944 |
| 2,512,212 | Molotzak | June 20, 1950 |
| 2,572,162 | Koonz | Oct. 23, 1951 |
| 2,572,386 | Ray | Oct. 23, 1951 |
| 2,797,546 | Reddi | July 2, 1957 |
| 2,802,483 | Davis | Aug. 13, 1957 |
| 2,838,943 | Modes et al. | June 17, 1958 |